(12) United States Patent
Håkansson

(10) Patent No.: US 9,895,643 B2
(45) Date of Patent: Feb. 20, 2018

(54) WET SCRUBBER AND A METHOD OF CLEANING A PROCESS GAS

(71) Applicant: ALSTOM Technology Ltd, Baden (CH)

(72) Inventor: Rikard Håkansson, Växjö (SE)

(73) Assignee: General Electric Technology GmbH, Baden (CH)

( * ) Notice: Subject to any disclaimer, the term of this patent is extended or adjusted under 35 U.S.C. 154(b) by 317 days.

(21) Appl. No.: 14/735,517

(22) Filed: Jun. 10, 2015

(65) Prior Publication Data
US 2015/0336049 A1    Nov. 26, 2015

Related U.S. Application Data

(62) Division of application No. 13/992,822, filed as application No. PCT/IB2011/002745 on Nov. 16, 2011, now Pat. No. 9,079,131.

(30) Foreign Application Priority Data

Dec. 10, 2010 (EP) .................................. 10194445

(51) Int. Cl.
| | | |
|---|---|---|
| *B01D 53/18* | (2006.01) | |
| *B01D 47/06* | (2006.01) | |
| *B01D 53/79* | (2006.01) | |
| *B01D 3/00* | (2006.01) | |

(Continued)

(52) U.S. Cl.
CPC ............. *B01D 47/06* (2013.01); *B01D 3/008* (2013.01); *B01D 53/504* (2013.01); *B01D 53/79* (2013.01); *F23J 15/003* (2013.01); *B01D 2247/04* (2013.01); *B01D 2247/08* (2013.01); *B01D 2247/10* (2013.01); *B01D 2251/404* (2013.01); *B01D 2258/0283* (2013.01);

(Continued)

(58) Field of Classification Search
CPC .......... B01D 2259/124; B01D 2247/04; B01D 2247/00; B01D 2247/08; B01D 2247/10; B01D 3/00; B01D 3/008; B01D 47/06; B01D 53/504; B01D 53/79; B01D 53/50; B01D 53/18; F23J 2215/20; F23J 2215/50; F23J 2219/40; F23J 15/00; F23J 15/003
See application file for complete search history.

(56) References Cited

U.S. PATENT DOCUMENTS

| | | | | |
|---|---|---|---|---|
| 4,315,872 A | * | 2/1982 | Senjo | B01D 47/12 261/113 |
| 6,102,377 A | * | 8/2000 | Doughty | B01D 53/504 261/117 |

FOREIGN PATENT DOCUMENTS

EP    0524729 A1 *  1/1993  ........... B01D 53/504

* cited by examiner

*Primary Examiner* — Melvin C Mayes
*Assistant Examiner* — Smita Patel
(74) *Attorney, Agent, or Firm* — GE Global Patent Operation; Rita D. Vacca

(57) ABSTRACT

A wet scrubber (1) useful for cleaning a process gas comprises at least a first spray level system (20) and a second spray level system (26) arranged vertically above the first spray level system (20) in a wet scrubber tower (2). The first spray level system (20) comprises at least one gas-liquid contacting plate (38) which is operative for deflecting absorption liquid, that has been atomized by means of the second spray level system (26) and flowing downward in the wet scrubber tower (2), so deflected absorption liquid (AL)

(Continued)

may contact process gas (F) contacted by absorption liquid atomized by the first spray level system (20).

5 Claims, 7 Drawing Sheets

(51) Int. Cl.
*B01D 53/50* (2006.01)
*F23J 15/00* (2006.01)

(52) U.S. Cl.
CPC ........ *F23J 2215/20* (2013.01); *F23J 2215/50* (2013.01); *F23J 2219/40* (2013.01); *Y02E 20/326* (2013.01)

WET SCRUBBER AND A METHOD OF CLEANING A PROCESS GAS

This is a divisional application claiming priority to co-pending U.S. application Ser. No. 13/992,822, having a filing date of Aug. 14, 2013, entitled "WET SCRUBBER AND A METHOD OF CLEANING A PROCESS GAS", now U.S. Pat. No. 9,079,131, which claims priority to International Application No. PCT/IB2011/002745 having an International Filing Date of Nov. 16, 2011, which in turn claims priority to EP Application No. 10194445.2 having a filing date of Dec. 10, 2010, with each application incorporated herein in its entirety by reference.

FIELD OF THE INVENTION

The present invention relates to a method of cleaning a process gas by means of a wet scrubber comprising a wet scrubber tower, at least a first spray level system within the wet scrubber tower, with nozzles to which an absorption liquid is supplied for atomization by the nozzles, and a second spray level system arranged above the first spray level system in the wet scrubber tower to which an absorption liquid is supplied for atomization by nozzles comprised in the second spray level system.

The present invention further relates to a wet scrubber useful for cleaning a process gas.

BACKGROUND OF THE INVENTION

Combustion of a fuel, such as coal, oil, peat, waste, etc., in a combustion plant, such as a power plant, generates a hot process gas containing, among other components, sulphur oxides, $SO_x$, such as sulphur dioxide, $SO_2$, and carbon dioxide, $CO_2$. Sulphur dioxide is an environmental pollutant. Hence, it is necessary to remove at least a portion of the sulphur dioxide contained in a process gas before releasing the process gas into the atmosphere. Furthermore, with increasing focus on the negative environmental impacts of carbon dioxide gas, it has become important to remove also carbon dioxide from process gases before releasing them to the atmosphere.

WO 2008/042554 describes a wet scrubber in which a perforated plate is arranged adjacent to a number of atomizing nozzles. Each of the perforations in the perforated plate is aligned with a cone of absorption liquid sprayed from an atomizing nozzle.

The perforated plate illustrated in WO 2008/042554 may in some cases yield a rather high process gas pressure drop, which is not necessarily indicative of an increase in sulphur dioxide removal efficiency.

SUMMARY OF THE INVENTION

An object of the present invention is to provide a wet scrubber, and a method of using the wet scrubber to clean a process gas, more efficient than the prior art wet scrubber and prior art method of using the wet scrubber.

This object is achieved by means of the subject method of cleaning a process gas by means of a wet scrubber comprising a wet scrubber tower, at least a first spray level system within the wet scrubber tower, with nozzles to which an absorption liquid is supplied for atomization by the nozzles, and a second spray level system arranged above the first spray level system in the wet scrubber tower to which an absorption liquid is supplied for atomization by nozzles comprised in the second spray level system, the method comprising deflecting absorption liquid atomized by means of nozzles of the second spray level system flowing downwards in the wet scrubber tower, from the vicinity of at least one nozzle of the first spray level system by means of a gas-liquid contacting plate located vertically above the at least one nozzle of the first spray level system, to bring the deflected absorption liquid into contact with process gas that has been contacted by the absorption liquid atomized by the at least one nozzle of the first spray level system.

An advantage of the subject method is that contact between deflected absorption liquid and process gas contacted with absorption liquid atomized by the at least one nozzle of the first spray level system causes an intense liquid/gas intermixing, producing what could be referred to as a "cloud" of absorption liquid and process gas. This cloud of absorption liquid and process gas yields very efficient absorption of contaminants, such as sulphur dioxide and carbon dioxide, by the absorption liquid in the wet scrubber tower.

According to one embodiment the process gas flowing upwardly through the wet scrubber tower is contacted with absorption liquid atomized by first spray level system nozzles.

According to one method embodiment, an individual gas-liquid contacting plate is arranged in the wet scrubber tower vertically above each of at least half of all first spray level system nozzles. The gas-liquid contacting plates deflect absorption liquid from each of at least half of all the first spray level system nozzles positioned beneath gas-liquid contacting plates. An advantage of this embodiment is that removal of contaminants from the process gas becomes very efficient when a number of adjacent gas-liquid collecting plates arranged with open space therebetween cause absorption liquid deflection and intermixing with process gas.

According to one method embodiment, open space between adjacent gas-liquid contacting plates arranged within the same horizontal plane within the wet scrubber tower, allows the upward flow of process gas through the open spaces at a vertical process gas velocity of 5-15 m/s. With vertical process gas velocities less than 5 m/s, absorption liquid and process gas intermixing tends to be less efficient. With vertical process gas velocities greater than 15 m/s, the process gas pressure drop within the wet scrubber tower tends to increase to unacceptably high levels. Such high pressure drop levels are unacceptable due to the large amount of energy required to pass process gas through and out of the wet scrubber tower. Also, at greater vertical process gas velocities, a large portion of deflected absorption liquid becomes entrained within the process gas, causing increased liquid loads on wet scrubber tower mist eliminators, potentially causing an increased loss of absorption liquid from the wet scrubber.

According to one method embodiment, at least one damper is arranged adjacent to the at least one gas-liquid contacting plate. The subject method further comprising controlling the vertical velocity of the process gas contacting the deflected absorption liquid by the at least one gas-liquid contacting plate, by adjusting the damper. An advantage of this embodiment is that the vertical process gas velocity of the process gas contacting the deflected absorption liquid may be adjusted to a suitable velocity, such as 5-15 m/s, by adjusting the positioning of the damper.

A further object of the present invention is to provide a wet scrubber more efficient in removing contaminants from a process gas than the wet scrubber of the prior art.

This object is achieved by means of a wet scrubber useful for cleaning a process gas. The subject wet scrubber comprises at least a first spray level system with nozzles in a wet scrubber tower to which an absorption liquid may be supplied for atomization by the nozzles, a second spray level system arranged within the wet scrubber tower above the first spray level system, to which an absorption liquid may be supplied for atomization by the nozzles comprised in the second spray level system, and a wet scrubber tower housing the first and second spray level systems and comprising a process gas inlet arranged in a base portion of the wet scrubber tower, and a process gas outlet arranged in an upper portion of the wet scrubber tower. The first spray level system comprises at least one gas-liquid contacting plate located above at least one of the first spray level system nozzles. The at least one gas-liquid contacting plate deflecting absorption liquid flowing downwardly within the wet scrubber from atomizing nozzles of the second spray level system, away from at least one first spray level system nozzle, such that the deflected absorption liquid may contact process gas previously contacted by absorption liquid atomized by the at least one first spray level system nozzle.

An advantage of this wet scrubber embodiment is that it efficiently forces downwardly flowing absorption liquid originating from the second spray level system into contact with process gas just previously in contact with absorption liquid originating from first spray level system atomizing nozzles. Accordingly, the absorption liquid atomized by second spray level system nozzles first efficiently contacts process gas adjacent to second spray level system nozzles, and is then efficiently diverted to contact the process gas once more, adjacent the first spray level system.

According to one embodiment, the subject first spray level system comprises a number of separate gas-liquid contacting plates arranged within the wet scrubber tower above each of at least half of all of the first spray level system nozzles. The more nozzles equipped with a corresponding gas-liquid contacting plate, the more efficient the intermixing of deflected absorption liquid and process gas.

According to one embodiment, the total combined horizontal surface area of all gas-liquid contacting plates within the first spray level system equals approximately 30 to 75% of the internal wet scrubber horizontal cross-sectional area when measured in the same horizontal plane as the at least one gas-liquid contacting plate. It is preferable that the total combined horizontal surface area of all gas-liquid contacting plates covers at least 30% of the internal wet scrubber horizontal cross-sectional area, since a reduction in the total combined horizontal surface area of all the gas-liquid contacting plates reduces the deflection of absorption liquid flowing downwardly inside the wet scrubber tower. Reduced deflection equates with reduced efficiency in intermixing the deflected absorption liquid and process gas. Preferably, the total combined horizontal surface area of all gas-liquid contacting plates covers not more than approximately 75% of the internal wet scrubber horizontal cross-sectional area when measured in the same plane as that of the gas-liquid contacting plates. Greater gas-liquid contacting plate coverage equates with an increase in the process gas pressure drop, thus requiring a large amount of energy to pass process gas through and out of the wet scrubber tower. Coverage greater than 75% may also substantially increase the amount of absorption liquid entrained within the upwardly flowing process gas thus increasing the risk of losing absorption liquid from the wet scrubber tower.

According to one embodiment, the shortest distance from a point on a bottom surface of the at least one gas-liquid contacting plate to a spray opening of a nozzle therebelow is approximately 0.1 to 0.9 m. Preferably, the shortest distance from a point on a bottom surface of the at least one gas-liquid contacting plate to a spray opening of a nozzle therebelow is at least 0.1 m, since lesser distances may force process gas out of the sprayed absorption liquid prematurely. Preferably, the shortest distance from a point on a bottom surface of the at least one gas-liquid contacting plate to a spray opening of a nozzle therebelow, is no more than approximately 0.9 m. Greater distances tend to unduly increase the required height of the wet scrubber tower, thus increasing investment and maintenance costs associated therewith. According to a further embodiment, the shortest distance from a point on a bottom surface of the at least one gas-liquid contacting plate to a spray opening of a nozzle therebelow is approximately 0.1 to 0.6 m.

According to one embodiment, the first spray level system comprises at least one adjustable damper located adjacent to the at least one gas-liquid contacting plate for controlling the vertical velocity of the process gas contacted by the deflected absorption liquid. An advantage of a damper is that contaminant removal efficiency may be achieved at various process gas flows, by adjusting the positioning of the damper to control and maintain the vertical process gas velocity within a suitable range. According to a further embodiment, the first spray level system comprises at least one damper arranged between at least two adjacent gas-liquid contacting plates, and in substantially the same horizontal plane as the at least two adjacent gas-liquid contacting plates. The subject damper may be used to adjust the size of the open space between the at least two adjacent gas-liquid contacting plates to control the vertical velocity of the process gas contacted by absorption liquid deflected by the two adjacent gas-liquid contacting plates. An advantage of this embodiment is that the damper enables efficient control of the vertical process gas velocity in the open space between two adjacent gas-liquid contacting plates. Furthermore, the subject damper may even be used to close at least some open spaces at times of very low process gas flow.

According to one embodiment, the total combined top surface area of all gas-liquid contacting plates of one spray level system is smaller than the total combined top surface area of all gas-liquid contacting plates of another spray level system arranged above the first-mentioned spray level system within the same wet scrubber tower. This embodiment takes into account the fact that absorption liquid volumes flowing downwardly through the wet scrubber tower are greater in the base portion of the wet scrubber tower than in the upper portion of the wet scrubber tower. Hence, an advantage of this embodiment is that the gas-liquid contacting plates may have a larger total combined top surface area when arranged in the upper portion of the wet scrubber tower, where the volume of absorption liquid is less.

According to one embodiment, at least the first spray level system nozzles spray at least half of the absorption liquid supplied thereto in a downward direction. Spraying at least half of the absorption liquid in a downward direction separates process gas contaminant removal by the first spray level system into two distinct and separate zones. A first zone of contaminant removal occurs when the process gas contacts absorption liquid sprayed by the first spray level system nozzles. A second zone of contaminant removal occurs, after that of the first zone, when deflected absorption liquid from spray level systems arranged within the wet scrubber tower above the first spray level system contacts process gas flowing from the first zone.

Further objects and features of the present invention will be apparent from the following detailed description and claims.

BRIEF DESCRIPTION OF THE DRAWINGS

The subject invention is described in more detail below with reference to the appended drawings in which.

DESCRIPTION OF PREFERRED EMBODIMENTS

Figure 1:
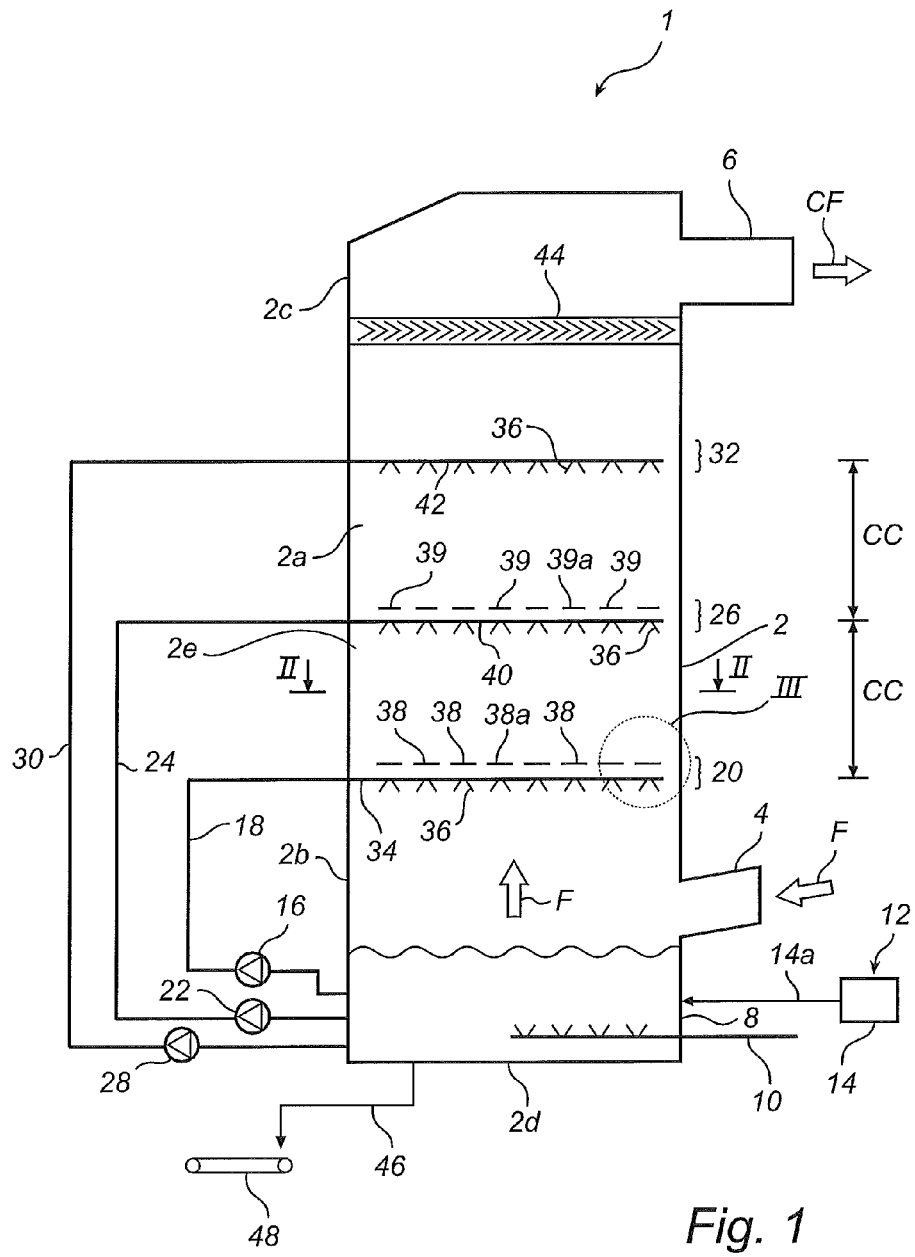
FIG. 1 is a schematic side view of a wet scrubber in accordance with a first embodiment.

FIG. 1 illustrates a wet scrubber 1. The wet scrubber 1 is operative for removing at least a portion of the sulphur dioxide content of a process gas, in the form of a flue gas, F, generated in a boiler (not shown) which is operative for combusting a fuel, such as coal, oil, peat, waste and the like.

Wet scrubber 1 comprises a vertical open wet scrubber tower 2 with interior 2a, a process gas inlet 4 arranged in a base portion 2b of wet scrubber tower 2 for flow of flue gas, F, to be cleaned into fluidly connected interior 2a, and a process gas outlet 6 arranged in an upper portion 2c of wet scrubber tower 2 for flow of cleaned flue gas, CF, from which at least a portion of the sulphur dioxide content has been removed, out of fluidly connected interior 2a. As illustrated in FIG. 1 as a vertical, upwardly pointed arrow, flue gas F travels substantially vertically upward inside interior 2a of wet scrubber tower 2.

An absorption liquid tank 8 is arranged at the bottom 2d of base portion 2b of wet scrubber tower 2. Absorption liquid tank 8 is equipped with a fluidly connected oxidation arrangement 10. An absorbent, such as fresh limestone, $CaCO_3$, is supplied to absorption liquid tank 8 from a fluidly connected absorbent supply device 12 comprising a limestone storage area 14 and a limestone supply pipe 14a. It will be appreciated that absorption liquid tank 8 may, as an alternative, be positioned outside of wet scrubber tower 2, and that the supply of limestone could, as an alternative, enter wet scrubber 1 at other locations, as a dry powder, a slurry or both.

Wet scrubber 1 further comprises a first circulation pump 16 which circulates in a fluidly connected absorption liquid circulation pipe 18, a limestone absorption liquid, sometimes referred to as a limestone slurry. Absorption liquid is pumped by first circulation pump 16 from absorption liquid tank 8 through fluidly connected circulation pipe 18 to a fluidly connected first spray level system 20 arranged horizontally across interior 2a in mid portion 2e of wet scrubber tower 2 adjacent base portion 2b. Wet scrubber 1 further comprises a second circulation pump 22 which circulates in a fluidly connected absorption liquid circulation pipe 24, a limestone absorption liquid from fluidly connected absorption liquid tank 8. Absorption liquid is pumped by second circulation pump 22 through fluidly connected circulation pipe 24 to a fluidly connected second spray level system 26 arranged horizontally across interior 2a in mid portion 2e of wet scrubber tower 2 above first spray level system 20. Wet scrubber 1 further comprises a third circulation pump 28 which circulates in a fluidly connected absorption liquid circulation pipe 30, a limestone absorption liquid from fluidly connected absorption liquid tank 8. Absorption liquid is pumped by third circulation pump 28 through fluidly connected circulation pipe 30 to a fluidly connected third spray level system 32 arranged horizontally across interior 2a in mid portion 2e of wet scrubber tower 2 above second spray level system 26. Distance CC illustrated in FIG. 1, is determined by measuring from the mid-point of one spray level system, e.g., the first spray level system 20, to the mid-point of an adjacent spray level system, e.g., the second spray level system 26. Distance CC is preferably approximately 1.25 m to 3 m. A distance CC less than 1.25 m is less preferable, due to unwanted absorption liquid spray interference between adjacent spray level systems, resulting in decreased sulphur dioxide removal efficiency. A distance CC more than 3 m is less preferable, since greater distances CC require increases in the overall height of wet scrubber tower 2, thus increasing investment and operating costs. It will be appreciated that a wet scrubber 1 could comprise more or less than three spray level systems, for example 2 to 10 spray level systems arranged in interior 2a of wet scrubber tower 2.

First spray level system 20 comprises a tubular portion 34 equipped with a number of fluidly connected atomizing nozzles 36 to finely distribute limestone absorption liquid supplied thereto by pump 16. Absorption liquid is finely distributed by nozzles 36 to achieve effective contact between the absorption liquid and the flue gas flowing upwardly through interior 2a of wet scrubber tower 2. All or some of nozzles 36 may, for example, be of the same type as Model 22298-2CF-SILCNB75-120, available from Spraying Systems Co, Wheaton, Ill., USA. This type of atomizing nozzle is operative for a liquid flow of about 17 $m^3$/hour, corresponding to 17000 liters/hour, or 280 liters/minute, at a spraying pressure measured using water, of about 0.5 bar.

First spray level system 20 further comprises a number of gas-liquid contacting plates 38. Each gas-liquid contacting plate 38 is located vertically above a nozzle 36, as described in more detail hereinafter.

Second spray level system 26 is similar if not identical to first spray level system 20 and comprises a tubular portion 40 equipped with a number of fluidly connected atomizing nozzles 36 and a number of gas-liquid contacting plates 39. Gas-liquid contacting plates 39 of second spray level system 26 may be of the same shape and size as gas-liquid contacting plates 38 of first spray level system 20, or may have a different shape and/or size. In accordance with one alternative, top side 39a of at least some of gas-liquid contacting plates 39 may have a larger surface area than that of top side 38a of at least some of gas-liquid contacting plates 38.

Third spray level system 32 comprises a tubular portion 42 equipped with a number of atomizing nozzles 36. The third, and uppermost, spray level system 32 may be arranged without any gas-liquid contacting plates.

A mist eliminator 44 is located above third spray level system 32. Mist eliminator 44 arranged horizontally across interior 2a in upper portion 2c adjacent to process gas outlet 6, removes at least a portion of the absorption liquid droplets entrained by cleaned flue gas, CF. Hence, absorption liquid droplets are removed from cleaned flue gas CF as the cleaned flue gas flows upwardly through interior 2a of wet scrubber tower 2, prior to exiting wet scrubber 1 via process gas outlet 6.

In wet scrubber 1, sulphur dioxide, $SO_2$, in the flue gas reacts with limestone, $CaCO_3$, in the absorption liquid to form calcium sulphite, $CaSO_3$, which is subsequently oxidized to form gypsum, $CaSO_4$. The oxidation of calcium sulphite is preferably performed by bubbling air or oxygen gas through the absorption liquid using oxidation arrangement 10. Hence, the absorption liquid comprises, in addition to the limestone, also small amounts of calcium sulphite and, as a major constituent, gypsum. Gypsum formed through this process is removed from wet scrubber 1 via a fluidly connected disposal pipe 46 to a fluidly connected gypsum dewatering unit, schematically illustrated as belt filter 48. The dewatered gypsum may be commercially used, for example in wallboard production.

In addition to sulphur dioxide, $SO_2$, wet scrubber 1 removes, at least partly, other contaminants from the flue gas also. Examples of such other contaminants include sulphur trioxide, $SO_3$, hydrochloric acid, HCl, hydrofluoric acid, HF, and other acidic process contaminants. Still further, wet scrubber 1 may also remove, at least partly, other types of contaminants from the flue gas, such as for example dust particles and mercury.

Figure 2:
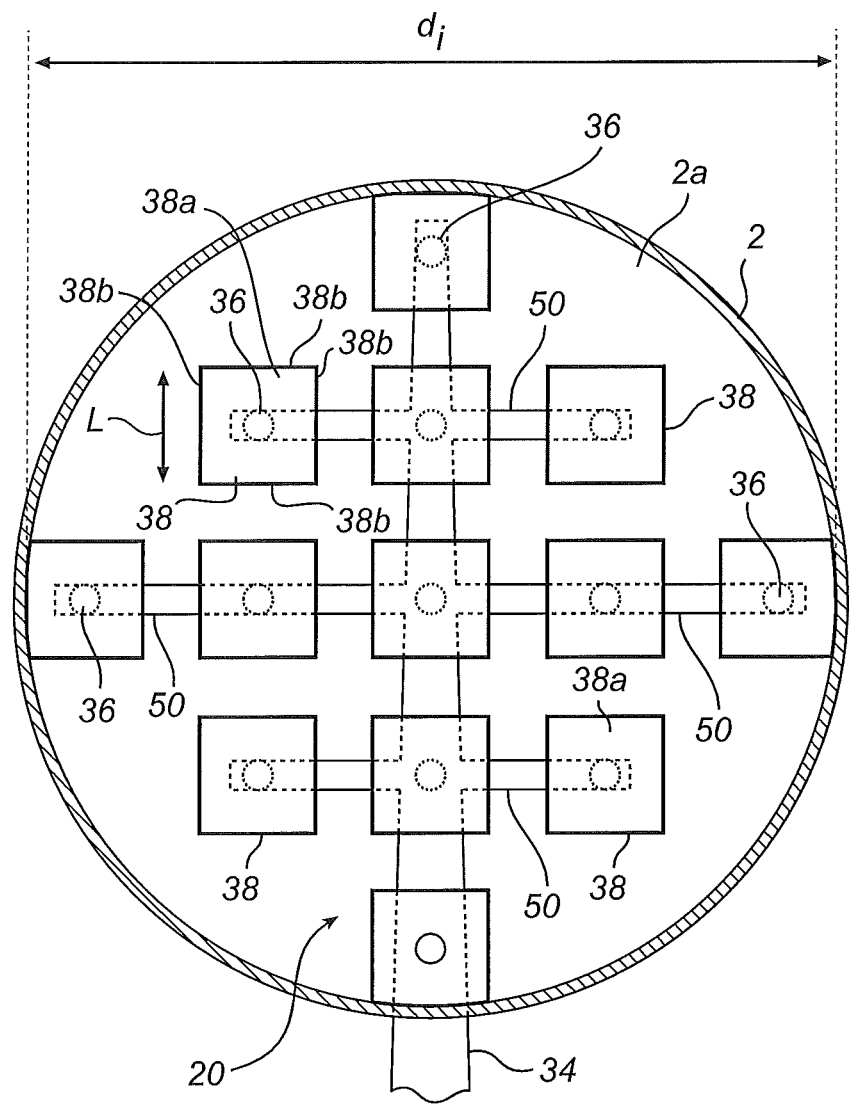
FIG. 2 is a schematic top view of a spray level system of the wet scrubber of FIG. 1 taken along line II-II.

FIG. 2 illustrates an enlarged top view of first spray level system 20 taken along line II-II of FIG. 1. The second spray level system 26 (not illustrated) has the same principal design as illustrated first spray level system 20. As illustrated in FIG. 2, tubular portion 34 is equipped with a number of fluidly connected perpendicular tubular extensions 50 forming a "grid" with and extending from tubular portion 34. Atomizing nozzles 36 fluidly connect to tubular portion 34 and tubular extensions 50 so that nozzles 36 of first spray level system 20 are rather evenly distributed over the entire horizontal cross-section of wet scrubber tower 2.

In the embodiment illustrated in FIG. 2 each nozzle 36 is covered by a single, corresponding gas-liquid contacting plate 38. In the embodiment illustrated in FIG. 2, the total number of nozzles 36 of first spray level system 20 is 13. It will be appreciated that any suitable number of nozzles 36 could be utilized. Furthermore, a nozzle 36 could be connected directly to tubular portion 34 or tubular extension 50, as the case may be, as is illustrated in FIG. 2, or could be connected to portion 34 or extension 50 via a fluidly connected connecting pipe in a per se known manner. Typically, the number of nozzles 36 in each spray level system 20 would range from about 4 to about 500. Furthermore, it is not necessary to arrange a single, corresponding gas-liquid contacting plate 38 above each nozzle 36. It may, for example, be sufficient to arrange gas-liquid contacting plates 38 above some of the nozzles 36, for example above 5 to 10 of the 13 nozzles 36 illustrated in FIG. 2. It may be preferred to arrange single, corresponding gas-liquid contacting plates 38 above each of at least half of nozzles 36 of a spray level system 20. More preferably, at least 75% of all of the nozzles 36 of a spray level system 20 may be equipped with single, corresponding gas-liquid contacting plates 38 thereabove.

The internal diameter, di, of interior 2a of wet scrubber tower 2, measured at the level of the gas-liquid contacting plates 38 of spray level system 20, is 5 m in the example depicted in FIG. 2. Thus, the interior 2a of wet scrubber tower 2 horizontal cross-sectional area measured at the level of the gas-liquid contacting plates 38 of spray level system 20, is about 20 m$^2$ ($\pi r^2 = 3.14 \times 5/2 \times 5/2 = 19.6$ m$^2$). In the embodiment of FIG. 2, each gas-liquid contacting plate 38 is substantially square in top view, with a planar top surface 38a bounded by four free edges 38b. Each of the four free edges 38b has a length L of approximately 0.85 m. Hence, the area of top surface 38a is 0.72 m$^2$ ($L^2 = 0.85 \times 0.85 = 0.72$ m$^2$). The total combined area of all gas-liquid contacting plates 38 of the spray level system 20 is $13 \times 0.72$ m$^2 = 9.36$ m$^2$. Hence, the gas-liquid contacting plates 38 cover, in total, 9.36 m$^2$/20 m$^2 = 47\%$ of interior 2a wet scrubber tower 2 horizontal cross-sectional area measured at the level of gas-liquid contacting plates 38 of spray level system 20. It has been found that gas-liquid contacting plates 38 of spray level system 20 may in combination constitute 30 to 75% of the interior 2a wet scrubber tower 2 horizontal cross-sectional area measured at the level of gas-liquid contacting plates 38 of spray level system 20.

In accordance with one embodiment, the total combined area of all top surfaces 38a of a particular spray level system increases, moving from spray level system to spray level system with flue gas flow through wet scrubber tower 2. Hence, for example, the top surfaces 39a of gas liquid contacting plates 39 of second spray level system 26 may have a total combined area of 11 m$^2$. Accordingly, gas-liquid contacting plates 39 occupy 11 m$^2$/20 m$^2 = 55\%$ of the interior 2a wet scrubber tower 2 horizontal cross-sectional area measured at the level of the gas liquid contacting plates 39 of the second spray level system 26. Such compares to the 47% occupied by gas-liquid contacting plates 38 of first spay level system 20. The reason for such design is that the closer to base portion 2b a spray level system is arranged, the more absorbent liquid is present, creating an increased need for open space.

Figure 3:
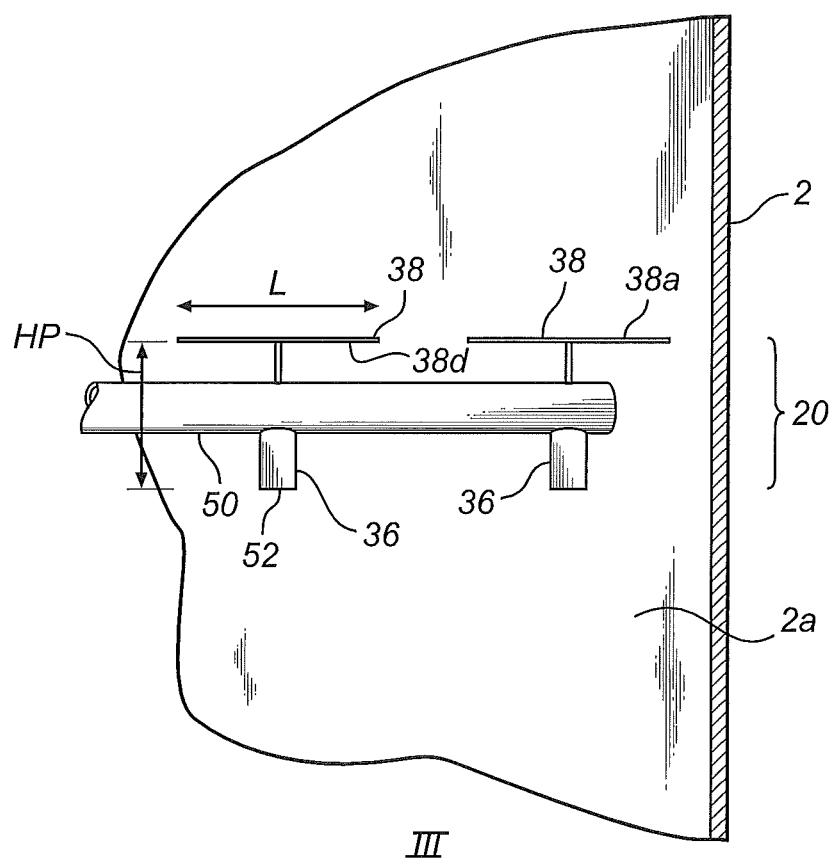
FIG. 3 is an enlarged schematic side view of area III of FIG. 1 illustrating detailed features of a spray level system.

FIG. 3 is an enlarged side view of area III of FIG. 1 illustrating in more detail spray level system 20. Each gas-liquid contacting plate 38 is centred over a corresponding nozzle 36 fluidly connected to tubular extension 50. The vertical distance, HP, is the vertical distance from a nozzle 36 spray opening 52 to a closest point on bottom surface 38d of the corresponding gas-liquid contacting plate 38. Distance HP is typically approximately 0.1 to 0.9 m, often approximately 0.1 to 0.6 m. Nozzles 36 are arranged for spraying at least a portion of the absorption liquid supplied thereto in a downward direction within interior 2a of wet scrubber tower 2. In accordance with one embodiment, at least half of the absorption liquid supplied to nozzles 36 is sprayed in a downward direction.

In accordance with one embodiment, substantially all of the absorption liquid supplied to nozzles 36 is sprayed in a downward direction.

Figure 4:
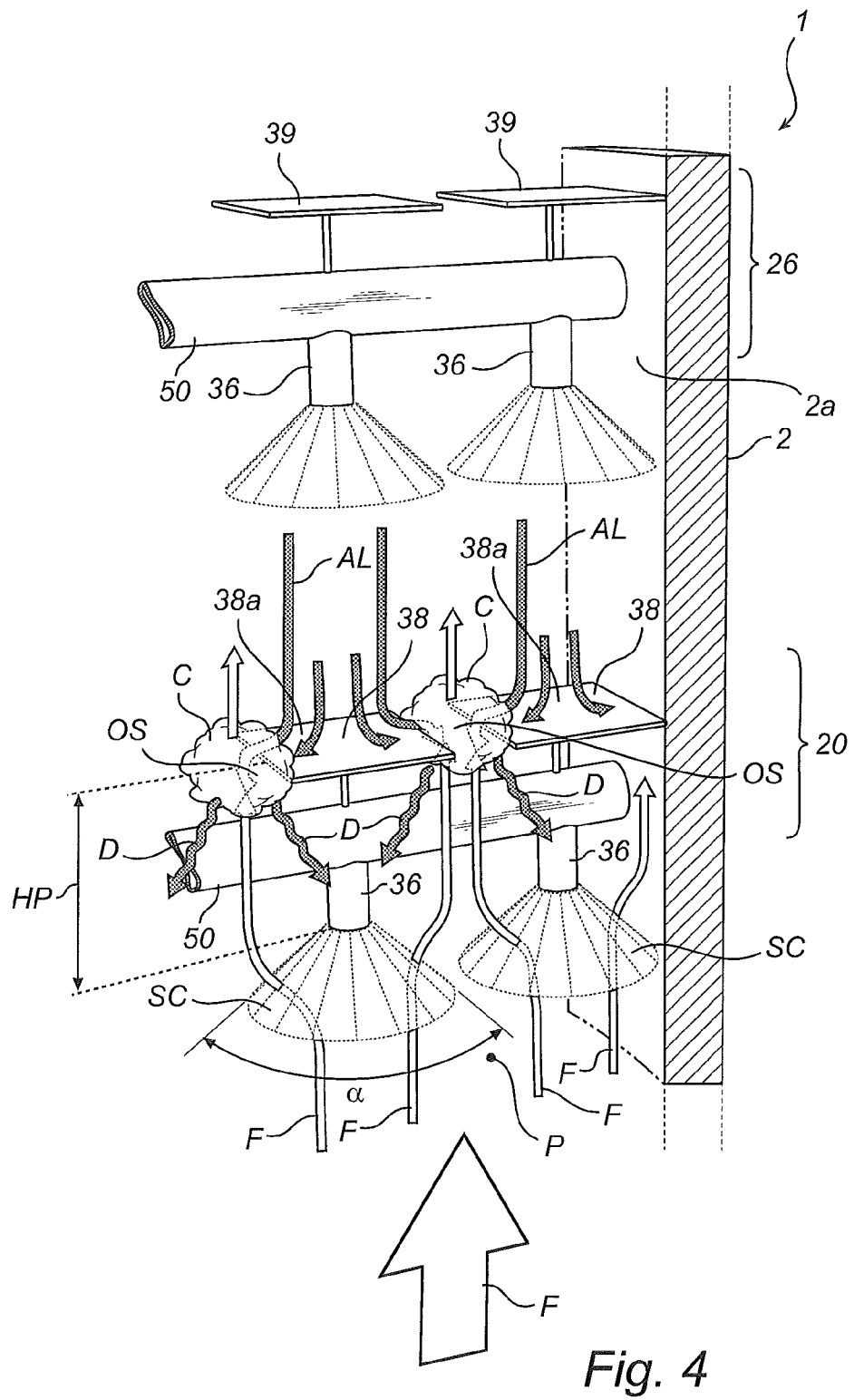
FIG. 4 is an enlarged schematic perspective view of two spray level systems in operation.

FIG. 4 illustrates in perspective view spray level systems 20, 26 when in operation. Nozzles 36 of first spray level system 20 atomize absorption liquid supplied thereto and generate a spray cloud SC of absorption liquid. Typically, nozzles 36 provide an absorption liquid spray angle α of approximately 60° to 180°, and more typically approximately 90° to 130°. As illustrated in FIG. 4, under the momentum of atomized absorption liquid from nozzles 36 of first spray level system 20, flue gas F is forced away from nozzles 36 toward open spaces between adjacent nozzles 36. Hence, flue gas F flows as far away from nozzles 36 as possible. Absorption liquid, illustrated in FIG. 4 with shaded arrows AL, atomized by nozzles 36 of second and third spray level systems 26 and 32, flows downwardly in wet scrubber tower 2 contacting, at least partly, top surface 38a of gas-liquid contacting plates 38. Absorption liquid AL then flows towards open spaces OS between gas-liquid contacting plates 38.

The open spaces OS coincide with the flow path of flue gas F due to the momentum of atomized absorption liquid from nozzles 36 of first spray level system 20. In open spaces OS an intense intermixing of flue gas F and absorption liquid AL occurs. Such intense intermixing leads to the formation of what could be regarded as "clouds" C adjacent to open spaces OS. In open spaces OS, flue gas F has a relatively high vertical flue gas velocity, due to a substantial portion of the interior 2a cross-sectional area of wet scrubber tower 2 being occupied by gas-liquid contacting plates 38. Typically, vertical flue gas velocity may be approximately 5 to 15 m/s, often 6 to 10 m/s, in open spaces OS. The vertical flue gas velocity in the open spaces OS may, for example, be calculated from the measured gas flow in tower 2, measured for example at a point P just below the spray level system 20, or obtained from sensors in the general plant control system, and dividing the thus measured gas flow, in m$^3$/s, by the total open interior 2a wet scrubber tower 2 horizontal cross-sectional area measured at the level of the gas-liquid contacting plates 38. The vertical flue gas velocity is the actual gas velocity measured at the actual gas temperature, actual gas pressure, and actual gas composition prevailing just below the spray level system 20 at point P. The point P is suitably located on a vertical level where no portion of interior 2a cross-sectional area of wet scrubber tower 2 is occupied by tubular extensions 50, nozzles 36, plates 38, or the like. Hence, point P is located in what could be referred to as an "empty floor" of interior 2a, meaning that the flue gas velocity measured in point P reflects the flue gas velocity that would prevail in wet scrubber tower 2 if it was empty of all internal structures. Using the example provided above, the total open interior 2a wet scrubber tower 2 horizontal cross-sectional area at the level of the plates 38 is calculated as the internal wet scrubber horizontal cross-sectional area minus the total horizontal surface area of top surface 38a of gas-liquid contacting plates 38. In the present example, the total open internal wet scrubber horizontal cross-sectional area is 10.64 m$^2$, i.e., 20 m$^2$–9.36 m$^2$=10.64 m$^2$. With a total gas flow through tower 2 of 80 m$^3$/s, as measured, for example, at point P, the vertical flue gas velocity in the open spaces OS is 7.5 m/s, i.e., 80 m$^3$/s/10.64 m$^2$=7.5 m/s.

With such a high vertical flue gas velocity in the open spaces OS, the absorption liquid AL entering open spaces OS from second and third spray level systems 26, 32 dissipates, clears or drains from the flue gas F quite slowly. Slow absorption liquid AL dissipation results in the formation of the "clouds" C adjacent to and above open spaces OS. Clouds C comprise flue gas F mixed with absorption liquid AL that cannot easily drain or dissipate. Hence, clouds C almost resemble bubbling beds of turbulence within wet scrubber tower 2. The intense mixing of absorption liquid AL and flue gas F in clouds C results in increased sulphur dioxide absorption levels and thereby efficient removal of sulphur dioxide from flue gas F. Absorption liquid AL eventually drains from cloud C, illustrated in FIG. 4 as flow D. However, absorption liquid AL has a relatively long average residence time in clouds C before draining therefrom.

Within wet scrubber tower 2, nozzles 36 are arranged so that at least half of the absorption liquid supplied thereto is sprayed in a downward direction. In fact, as illustrated in FIG. 4, all of the absorption liquid may be sprayed in a generally downward direction. Spraying absorption liquid in spray cloud SC in a generally downward direction from first spray level system 20 nozzles 36 separates the removal of sulphur dioxide from the flue gas into two distinct and separate zones of sulphur dioxide absorption of the first spray level system 20. A first zone is the spray cloud SC formed upon flue gas F contacting absorption liquid sprayed from nozzles 36 of the first spray level system 20. A second zone is the cloud C formed from the deflected absorption liquid AL from spray level systems 26, 32 contacting flue gas F flowing from the first zone, i.e., flue gas F just previously contacted with absorption liquid in spray cloud SC from nozzles 36 of the first spray level system 20.

Figure 5A:
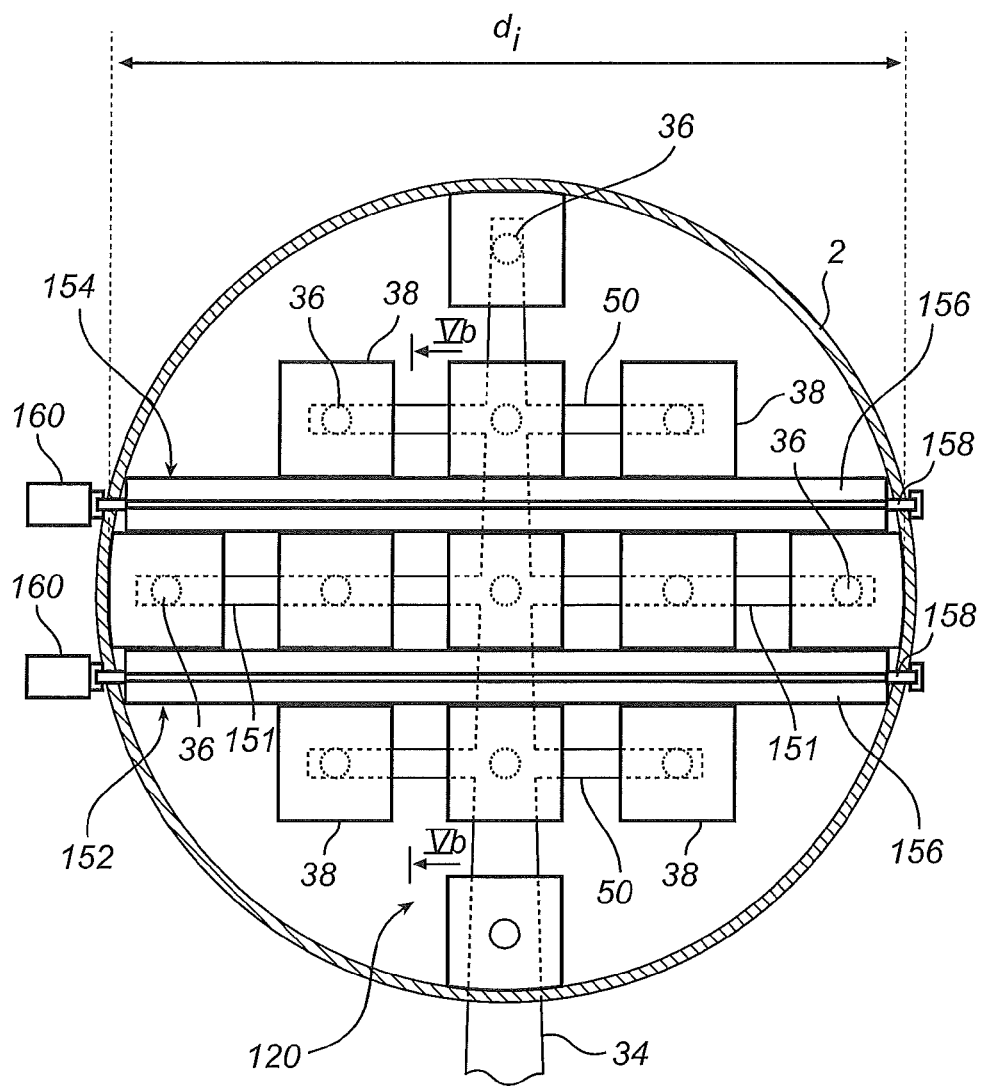
FIG. 5a is a schematic top view of a spray level system in accordance with an alternative embodiment.
Figure 5B:
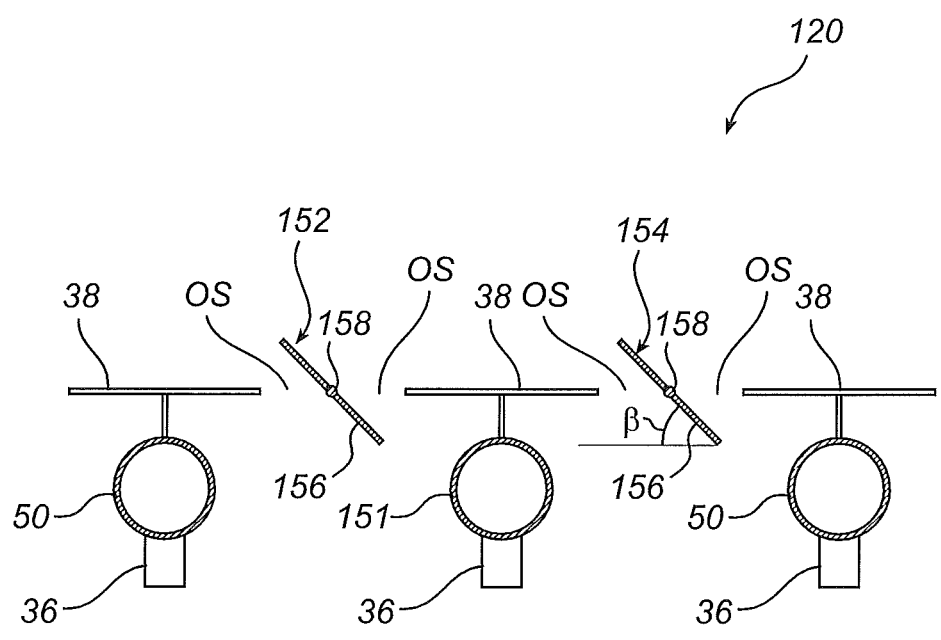
FIG. 5b is a side view of the spray level system of FIG. 5a taken along line Vb-Vb.

FIGS. 5a and 5b depict a spray level system 120 in accordance with an alternative embodiment. Features of FIGS. 5a and 5b that are similar to features of the spray level system 20 described hereinbefore with reference to FIGS. 1-4, have been given the same reference numerals. FIG. 5a illustrates a spray level system 120 in top view. A tubular portion 34 is provided with a number of fluidly connected tubular extensions 50, 151 forming a "grid" extending from tubular portion 34. A number of atomizing nozzles 36 are fluidly connected to tubular portion 34 and tubular extensions 50, 151 in such a manner that nozzles 36 become rather evenly distributed over the entire horizontal cross-section of wet scrubber tower 2. Each nozzle 36 is arranged beneath a gas-liquid contacting plate 38, in a similar manner as described hereinbefore with reference to FIG. 2.

Spray level system 120 is provided with a first damper arrangement 152 and a second damper arrangement 154. Each damper arrangement 152, 154 extends horizontally across wet scrubber tower 2. The first and second damper arrangements 152, 154 extend on either side of a central tubular extension 151. Each first and second damper arrangement 152, 154 comprises within wet scrubber tower 2 a damper in the form of a damper blade 156 and a horizontal damper shaft 158. Also, each first and second damper arrangement 152, 154 comprises a damper motor 160 arranged outside of wet scrubber tower 2 for rotating horizontal damper shaft 158 to position damper blade 156 as desired.

FIG. 5b, illustrating a side view of spray level system 120 taken in the direction of arrows Vb-Vb of FIG. 5a, depicts first and second damper arrangements 152, 154 arranged on either side of central tubular extension 151. The respective horizontal damper shafts 158 of arrangements 152, 154 are arranged in substantially the same horizontal plane across wet scrubber tower 2, as the gas-liquid contacting plates 38. By rotating damper shafts 158 using motors 160 of FIG. 5a, the angle $\beta$ of damper blades 156 with respect to its horizontal plane may be adjusted. Angle $\beta$ of damper blades 156 influences the width of open spaces OS between the gas-liquid contacting plates 38. Hence, when angle $\beta$ is about 90°, damper blades 156 have very little influence on flue gas F flow through open spaces OS. An angle $\beta$ of about 90° would typically be utilized when a wet scrubber tower 2 is operated at full flue gas F flow load. When angle $\beta$ is reduced, for example, to about 40° as depicted in FIG. 5b, open spaces OS are substantially reduced, resulting in an increased flue gas F flow velocity through open spaces OS located adjacent damper blades 156. Hence, an angle $\beta$ of less than 90° may be used when wet scrubber tower 2 is operated at a reduced flow load, for example at 75% of full flue gas F flow load. By adjusting angle $\beta$, the vertical gas flow velocity through open spaces OS may be adjusted within a desired range of about 5 m/s to about 15 m/s. Also, when the wet scrubber tower 2 is operated at a reduced load, angle $\beta$ may be adjusted accordingly. Angle $\beta$ may even be reduced to 0°. In such an event, open spaces OS adjacent to damper blades 156 are completely or are almost completely blocked by damper blades 156. However, as illustrated in FIG. 5a, the two damper arrangements 152, 154 even if adjusted to have an angle β of 0°, do not serve to block all open spaces OS surrounding gas-liquid contacting plates 38. Open spaces OS through which flue gas F may flow still remain. The vertical flue gas velocity in the remaining open spaces OS may be within the desired range of 5 m/s to 15 m/s. If the vertical flue gas velocity in the remaining open spaces OS is not within the desired range of 5 m/s to 15 m/s, damper arrangements 152, 154 may be adjusted to achieve the same. Hence, with the damper arrangements 152, 154 it becomes possible to generate the desired "clouds" C described hereinbefore with reference to FIG. 4. Also, when the flue gas flow load is lower than full operating gas flow, damper arrangements 152, 154 may be adjusted to maintain the desired clouds C. It will be appreciated that damper arrangements 152, 154 may be utilized for blocking or partially blocking open spaces OS even in situations when the flue gas flow load is at full operating gas flow. Blocking or partially blocking open spaces OS in conditions of full operating gas flow may be beneficial if the amount of sulphur dioxide requiring removal is temporarily increased. An increased vertical flue gas velocity through the open spaces OS increases under such conditions the sulphur dioxide removal efficiency.

It will be appreciated that other types of dampers may also be useful, including dampers in which horizontal plates are made to slide over open spaces OS when needed.

Figure 6:
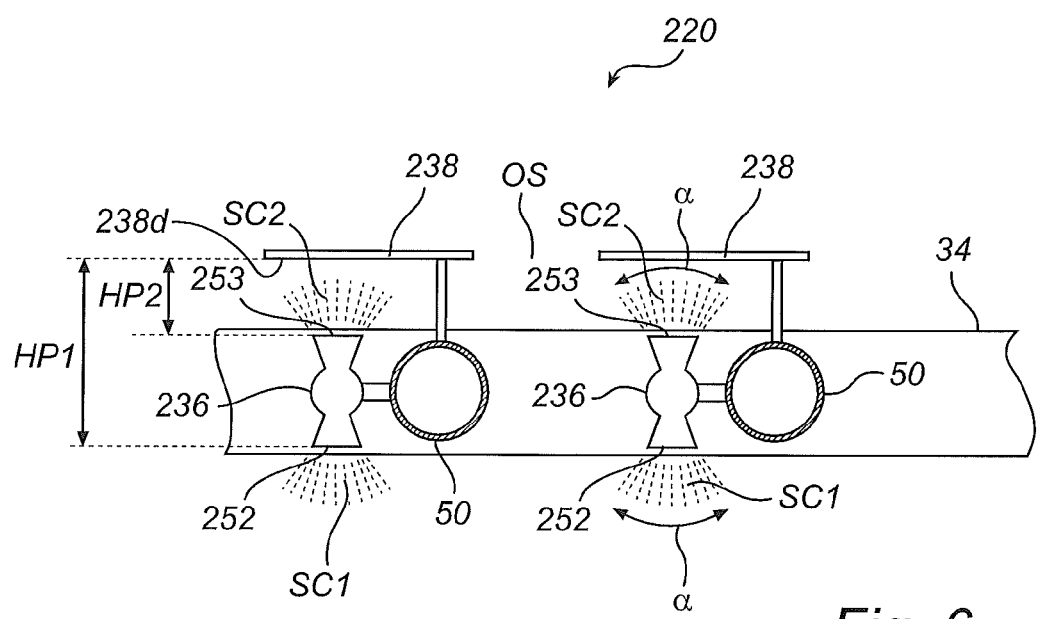
FIG. 6 is a side view of a spray level system in accordance with yet another alternative embodiment.

FIG. 6 depict a spray level system 220 in accordance with a further alternative embodiment. Features of FIG. 6 that are similar to features of the spray level system 20 described hereinbefore with reference to FIGS. 1-4, have been given the same reference numerals. FIG. 6 illustrates spray level system 220 in a side view. A tubular portion 34, which is similar to tubular portion 34 illustrated in FIG. 2, is provided with a number of fluidly connected tubular extensions 50. A number of atomizing nozzles 236 are fluidly connected to tubular extensions 50. Each nozzle 236 is arranged beneath a gas-liquid contacting plate 238, in a similar manner as described hereinbefore with reference to FIG. 2.

The nozzles 236 are so-called dual orifice nozzles, for example Dual Orifice WhirlJet Nozzles, that are available from Spraying Systems Co, Wheaton, Ill., USA. The nozzles 236 eject absorption liquid in two directions. A first portion of the amount of liquid supplied to nozzle 236 is atomized and ejected from first, lower, nozzle 236 spray opening 252 and generate a spray cloud SC1 of absorption liquid. The spray cloud SC1 is generally downwardly directed. A second portion of the amount of liquid supplied to nozzle 236 is atomized and ejected from second, upper, nozzle 236 spray opening 253 and generate a spray cloud SC2 of absorption liquid. The spray cloud SC2 is generally upwardly directed. Typically, nozzles 236 provide an absorption liquid spray angle α in each direction of approximately 60° to 180°. Often at least 50% of the absorption liquid supplied to nozzle 236 is ejected from first, lower, spray opening 252.

Gas-liquid contacting plates 238 serve to deflect absorption liquid coming from a spray level system located vertically above spray level system 220 to open spaces OS between gas-liquid contacting plates 238 in accordance with similar principles as described hereinbefore with reference to FIG. 4. The vertical distance, HP1, HP2, respectively, is the vertical distance from a respective nozzle 236 spray opening 252, 253 to a closest point on bottom surface 238d of the corresponding gas-liquid contacting plate 238. Distance HP1, HP2 is typically approximately 0.1 to 0.9 m. With dual orifice type nozzles 236 arranged in the manner illustrated in FIG. 6, HP1 will be larger than HP2. In the embodiment illustrated in FIG. 6, the vertical distance HP1 from lower spray opening 252 to a closest point on bottom surface 238d may be 0.2 to 0.9 m. The vertical distance HP2 from upper spray opening 253 to a closest point on bottom surface 238d may be 0.1 to 0.8 m.

It will be appreciated that numerous variants of the embodiments described above are possible within the scope of the appended claims.

Hereinbefore it has been described that each spray level system is equipped with gas-liquid contacting plates that have, as seen from a top view thereof, the shape of squares. It will be appreciated that the gas-liquid contacting plates could also have shapes other than squares, including such shapes as circles, triangles, ovals, rectangles, other polygon shapes, irregular shapes or combinations thereof. A spray level arrangement may in itself comprise gas-liquid contacting plates of different shapes. For example, some gas-liquid contacting plates of a spray level system could be of a special shape to coincide with an interior circular wall forming wet scrubber tower 2. Likewise, the gas-liquid contacting plates need not be centred above a respective nozzle, but such a centred arrangement may be preferable. It is also preferable that, when in top view such as depicted in FIG. 2, each gas-liquid contacting plate 38 should completely obscure the entire nozzle 36 associated therewith. The gas-liquid contacting plates 38, 39 could be manufactured from any suitable material, including metal, such as stainless steel, various plastic materials, including fibre reinforced plastic, etc. The plate thickness of each gas-liquid contacting plate 38, 39 will depend on the mechanical strength of the material selected. Often a plate thickness of 2-15 mm will be suitable.

In the embodiment illustrated with reference to FIGS. 1-4, the two lower spray level systems 20, 26, of a total number of three spray level systems 20, 26, 32 arranged in "stacked" vertical alignment within wet scrubber tower 2, are provided with gas-liquid contacting plates 38, 39. It will be appreciated that wet scrubber tower 2 could comprise any number from two to twenty spray level systems arranged in stacked vertical alignment. Any number of these spray level systems could be provided with gas-liquid contacting plates. Hence, for example, in a wet scrubber tower 2 comprising five spray level systems, only one may be provided with gas-liquid contacting plates, and that one spray level system need not be the spray level system closest to the base of wet scrubber tower 2. Rather, for example, the one spray level system provided with gas-liquid contacting plates may be the central spray level system, i.e. the third spray level system from the base of wet scrubber tower 2. Furthermore, with the wet scrubber tower 2 comprising five spray level systems it would also be possible to provide all five spray level systems with gas-liquid contacting plates. However, the effect of using gas-liquid contacting plates in conjunction with the uppermost spray level system would be rather limited. Hence, gas-liquid contacting plates could be installed for one or more of all of the spray level systems of a wet scrubber tower 2, and for one or more of all of the nozzles of each spray level system, depending on the required efficiency for sulphur dioxide removal required of the wet scrubber tower 2. Hence, when a limited increase in removal efficiency is sufficient, then gas-liquid contacting plates could be installed in only one spray level system, and maybe only for some of the nozzles of that spray level system, while in other cases, where a large increase in sulphur dioxide removal is needed, it might be preferable to install gas-liquid contacting plates for all, or almost all, spray level systems, and for most, or even all, of the nozzles of those spray level systems.

It will be appreciated that the gas-liquid contacting plates could be used both when building a new wet scrubber installation, and when retrofitting an existing wet scrubber installation.

Hereinbefore, a method and a wet scrubber for removing sulphur dioxide from a process gas have been described. It will be appreciated that the method and wet scrubber may also be utilized for removing other contaminants from a process gas. For example, the method and wet scrubber could be utilized for removing carbon dioxide from a process gas. The removal of carbon dioxide from the process gas may, in such a case, often be conducted in a wet scrubber which is of a similar same type as the wet scrubber operating for removing sulphur dioxide, but which is located downstream, with respect to the direction of forwarding the process gas, of the wet scrubber in which sulphur dioxide is removed. Furthermore, while limestone may often be part of the absorption liquid in a sulphur dioxide removing wet scrubber, a carbon dioxide removing wet scrubber may utilize another type of absorption liquid, for example an absorption liquid comprising an ammoniated solution or an amine solution.

To summarize, a wet scrubber tower 2 cleaning a process gas comprises a first spray level system 20 and a second spray level system 26 which is arranged vertically above the first spray level system 20 within wet scrubber tower 2, each spray level system 20, 26 comprising nozzles 36 operative for atomizing absorption liquid. The first spray level system 20 comprises at least one gas-liquid contacting plate 38 located vertically above at least one of the nozzles 36 of the first spray level system 20. The gas-liquid contacting plate 38 deflects absorption liquid atomized by means of the second spray level system 26 from the vicinity of the at least one nozzle 36 of the first spray level system 20. The deflected absorption liquid may be brought into contact with process gas F previously brought into contact with the absorption liquid atomized by the first spray level system 20.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a process gas by means of a wet scrubber comprising:
    arranging a gas-liquid contacting plate vertically above at least one nozzle of a first spray level system;
    deflecting absorption liquid atomized by nozzles of a second spray level system flowing downwards in a wet scrubber tower, from the at least one nozzle of the first spray level system with the gas-liquid contacting plate arranged vertically above the at least one nozzle of the first spray level system;
    contacting the deflected absorption liquid with process gas already contacted by absorption liquid atomized by the at least one nozzle of the first spray level system; and
    controlling vertical velocity of the process gas contacting the deflected absorption liquid with at least one adjustable damper arranged adjacent to the gas-liquid contacting plate.

2. The method according to claim 1, wherein the gas-liquid contacting plate comprises an individual gas-liquid contacting plate arranged vertically above each of at least half of all nozzles of the first spray level system with absorption liquid deflected thereby.

3. The method according to claim 1, wherein open spaces between horizontally adjacent individual gas-liquid contacting plates, allow for vertical flue gas flow at a vertical process gas velocity of 5-15 m/s.

4. The method according to claim 1, wherein controlling vertical process gas velocity is by adjusting the at least one adjustable damper in the form of a damper blade arranged adjacent to the gas-liquid contacting plate.

5. The method according to claim 1, further comprising deflecting absorption liquid atomized by nozzles of a third spray level system flowing downwards in the wet scrubber tower from at least one nozzle of the second spray level system with a gas-liquid contacting plate located vertically above the at least one nozzle of the second spray level system.

* * * * *